United States Patent
Nakagawa et al.

(10) Patent No.: US 7,174,505 B2
(45) Date of Patent: Feb. 6, 2007

(54) DISPLAY ENGAGEMENT SYSTEM

(75) Inventors: Kenichi Nakagawa, Kawasaki (JP); Keisuke Katada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 768 days.

(21) Appl. No.: 10/108,340

(22) Filed: Mar. 29, 2002

(65) Prior Publication Data

US 2002/0198938 A1 Dec. 26, 2002

(30) Foreign Application Priority Data

Apr. 24, 2001 (JP) ............................. 2001-126081

(51) Int. Cl.
G06F 17/00 (2006.01)
(52) U.S. Cl. .................. 715/511; 709/204; 709/205
(58) Field of Classification Search ................ 715/711, 715/568, 512, 511; 709/224, 219, 217, 205, 709/204, 202; 707/2
See application file for complete search history.

(56) References Cited

U.S. PATENT DOCUMENTS

| | | | | |
|---|---|---|---|---|
| 5,337,407 A | * | 8/1994 | Bates et al. ................. | 715/751 |
| 5,515,491 A | * | 5/1996 | Bates et al. ................. | 715/754 |
| 5,530,795 A | * | 6/1996 | Wan ............................ | 715/759 |
| 5,537,526 A | * | 7/1996 | Anderson et al. ........... | 715/515 |
| 5,577,188 A | * | 11/1996 | Zhu ............................. | 715/745 |
| 5,583,982 A | * | 12/1996 | Matheny et al. ............ | 715/762 |
| 5,608,872 A | * | 3/1997 | Schwartz et al. ........... | 709/205 |
| 5,806,079 A | * | 9/1998 | Rivette et al. .............. | 715/512 |
| 5,826,025 A | * | 10/1998 | Gramlich .................... | 709/217 |
| 5,831,615 A | * | 11/1998 | Drews et al. ................ | 715/768 |
| 5,832,474 A | * | 11/1998 | Lopresti et al. ............. | 707/2 |
| 5,870,559 A | * | 2/1999 | Leshem et al. ............. | 709/224 |
| 5,940,082 A | * | 8/1999 | Brinegar et al. ............ | 345/442 |
| 5,987,525 A | * | 11/1999 | Roberts et al. ............. | 709/248 |
| 6,125,383 A | * | 9/2000 | Glynias et al. ............. | 709/202 |
| 6,144,991 A | * | 11/2000 | England ...................... | 709/205 |
| 6,154,773 A | * | 11/2000 | Roberts et al. ............. | 709/219 |
| 6,295,551 B1 | * | 9/2001 | Roberts et al. ............. | 709/205 |
| 6,332,155 B1 | * | 12/2001 | Notani ......................... | 709/205 |

(Continued)

FOREIGN PATENT DOCUMENTS

DE 197 17 167 A1 10/1998

(Continued)

OTHER PUBLICATIONS

S. Jacobs et al., "Filling HTML forms simultaneously: CoWeb—architecture and functionality", Computer Networks and ISDN Systems, vol. 28, Issues 7-11, May 1996, pp. 1385-1395.*

*Primary Examiner*—Doug Hutton
*Assistant Examiner*—James H. Blackwell
(74) *Attorney, Agent, or Firm*—Staas & Halsey LLP

(57) ABSTRACT

A relay server computer adds control code to background contents to generate web data for display engagement, and sends the generated web data to every client computer. The control code becomes a controller by executed on the client. When an object such as image is pasted on the background contents displayed in an engaged fashion, the controller detects the event occurred by pasting, and sends the information indicating the event to the other clients via relay server. Consequently, the screen with the object being pasted is displayed in an engaged fashion among all clients. The object can be moved, modified, or deleted.

8 Claims, 15 Drawing Sheets

U.S. PATENT DOCUMENTS

| | | | |
|---|---|---|---|
| 6,338,086 B1 * | 1/2002 | Curtis et al. | 709/218 |
| 6,342,906 B1 * | 1/2002 | Kumar et al. | 715/751 |
| 6,351,762 B1 * | 2/2002 | Ludwig et al. | 709/204 |
| 6,453,328 B1 * | 9/2002 | Schaeffer et al. | 715/515 |
| 6,542,165 B1 * | 4/2003 | Ohkado | 715/751 |
| 6,608,628 B1 * | 8/2003 | Ross et al. | 345/619 |
| 6,610,102 B1 * | 8/2003 | Aldred et al. | 715/509 |
| 6,687,878 B1 * | 2/2004 | Eintracht et al. | 715/512 |
| 6,721,921 B1 * | 4/2004 | Altman | 715/512 |
| 6,728,756 B1 * | 4/2004 | Ohkado | 709/205 |
| 6,754,693 B1 * | 6/2004 | Roberts et al. | 709/205 |
| 6,826,595 B1 * | 11/2004 | Barbash et al. | 709/204 |
| 6,894,703 B2 * | 5/2005 | Vernier et al. | 345/619 |
| 6,934,766 B1 * | 8/2005 | Russell | 709/246 |
| 2003/0023679 A1 * | 1/2003 | Johnson et al. | 709/204 |
| 2003/0103089 A1 * | 6/2003 | Ramani et al. | 345/848 |
| 2006/0059431 A1 * | 3/2006 | Pahud | 715/751 |

FOREIGN PATENT DOCUMENTS

| | | |
|---|---|---|
| EP | 0 874 323 A1 | 10/1998 |
| EP | 1 022 664 A2 | 7/2000 |
| EP | 1 022 664 A3 | 7/2000 |
| WO | WO 97/42728 | 11/1997 |
| WO | WO 005/56055 | 9/2000 |
| WO | WO 01/0484 A2 | 1/2001 |
| WO | WO 01/0484 A3 | 1/2001 |

* cited by examiner

FIG.7

PROTOCOL PA1

| Palette Registration | Sender's User ID | Receivers' User ID's | Palette No. | Image of Object |
|---|---|---|---|---|

PROTOCOL PA2

| Palette Registration | Sender's User ID | Receivers' User ID's | Registration Completed |
|---|---|---|---|

```
<html>
<head><title>sample</title>
</head>
<body>

<img src= 'basedata.png' >      <---- IMAGE FOR BACKGROUND

</body>
</html>
```

FIG.12

| PROTOCOL PB | | | | | | | |
|---|---|---|---|---|---|---|---|
| Manipulation of Object | Sender's User ID | Receivers' User ID's | Palette No. | Width and Height | Position X, Y | Z-Index | Frame No. |

OBJECT L1 PASTED BY OTHER CLIENT

```
<div style= '…①…' ><img src= 'image01.png' ></div>
```

OBJECT L2 PASTED BY THE CLIENT ITSELF

```
<div style= '…②…' ><img src= 'image04.png' onClick= 'func()' ></div>
                                            (DETECTION OF EVENT)
```

FIG.18

PROTOCOL PC1

| Snapshot | Sender's User ID | Receivers' User ID's | Instruction Made |

PROTOCOL PC2

| Snapshot | Sender's User ID | Receivers' User ID's | Completed | URL |

FIG.19

```
<html>
<head><title>sample</title>
</head>
<body>

<img src= 'basedata.png' >      <---- IMAGE FOR BACKGROUND

<div style= '---①---' ><img src= 'image01.png' ></div>  <----OBJECT L1
<div style= '---②---' ><img src= 'image04.png' ></div>  <----OBJECT L2'

</body>
</html>
```

DISPLAY ENGAGEMENT SYSTEM

BACKGROUND OF THE INVENTION

1. Field of the Invention

The present invention relates to a display engagement system which controls computers to display various contents in an engaged fashion. The present disclosure relates to subject matter contained in Japanese Patent application No. 2001-126081 (filed on Apr. 24, 2001), which is expressly incorporated herein by reference in its entirety.

2. Description of the Related Art

An art is known which controls computers to display common contents. This type of system comprises a WWW server machine providing contents such as HTML documents, and client machines. Provided that all of the clients display common contents in an engaged fashion, when a user operates one of clients to scroll the displayed contents, the operation is sent to all other clients to be reflected in the respective clients. Consequently, the clients always display the common contents in the same manner.

According to the above described art, however, each client only displays the common contents. It is therefore impossible that operators (users) of the clients execute manipulations such as pasting their desiring objects to the contents. When the art, for instance, utilized for a meeting, communication among users is subject to a certain restriction.

SUMMARY OF THE INVENTION

It is a primary object of the present invention to provide a display engagement system which makes a server computer paste various objects to common contents displayed on client computers in an engaged fashion on the basis of manipulations from users.

To accomplish the above object, according to one aspect of the present invention, the display engagement program makes a server computer execute the following steps. These steps include a step of sending said client computers web data including background contents, control code making the client computer display a layer object with reflecting manipulation on the same layer object, and control code making the client computer transmit manipulation on the layer object to said server computer; and a step of broadcasting, when the manipulation on the layer object is transmitted from one of said client computers, the same manipulation to the other client computers.

With this configuration, the client computer receives the control code from the server computer, and is controlled according to the control code. As a result, every client displays the screen where layer objects are pasted to the background contents in an engaged fashion. It is preferable that the layer objects can be moved, modified, and deleted.

The users can discuss intelligent and complicated matter by manipulating the layer objects displayed on the screens in an engaged fashion. The display engagement program may be utilized for real-time design review among designers at remote locations. The display engagement program may be utilized as a collaborative web page creating tool, which creates web pages with reflecting the customer's suggestions.

BRIEF DESCRIPTION OF THE DRAWINGS

The invention will be described below in detail with reference to the accompanying drawings, in which:

FIG. 7 is a schematic diagram showing a protocol prescribed for registration with a palette table;

FIG. 12 is a schematic diagram showing a protocol prescribed for manipulating information;

FIG. 18 is a schematic diagram showing a protocol prescribed for a snapshot process; and FIG. 19 is an explanatory diagram showing an example of snap data.

DESCRIPTION OF THE PREFERRED EMBODIMENT

Figure 1:
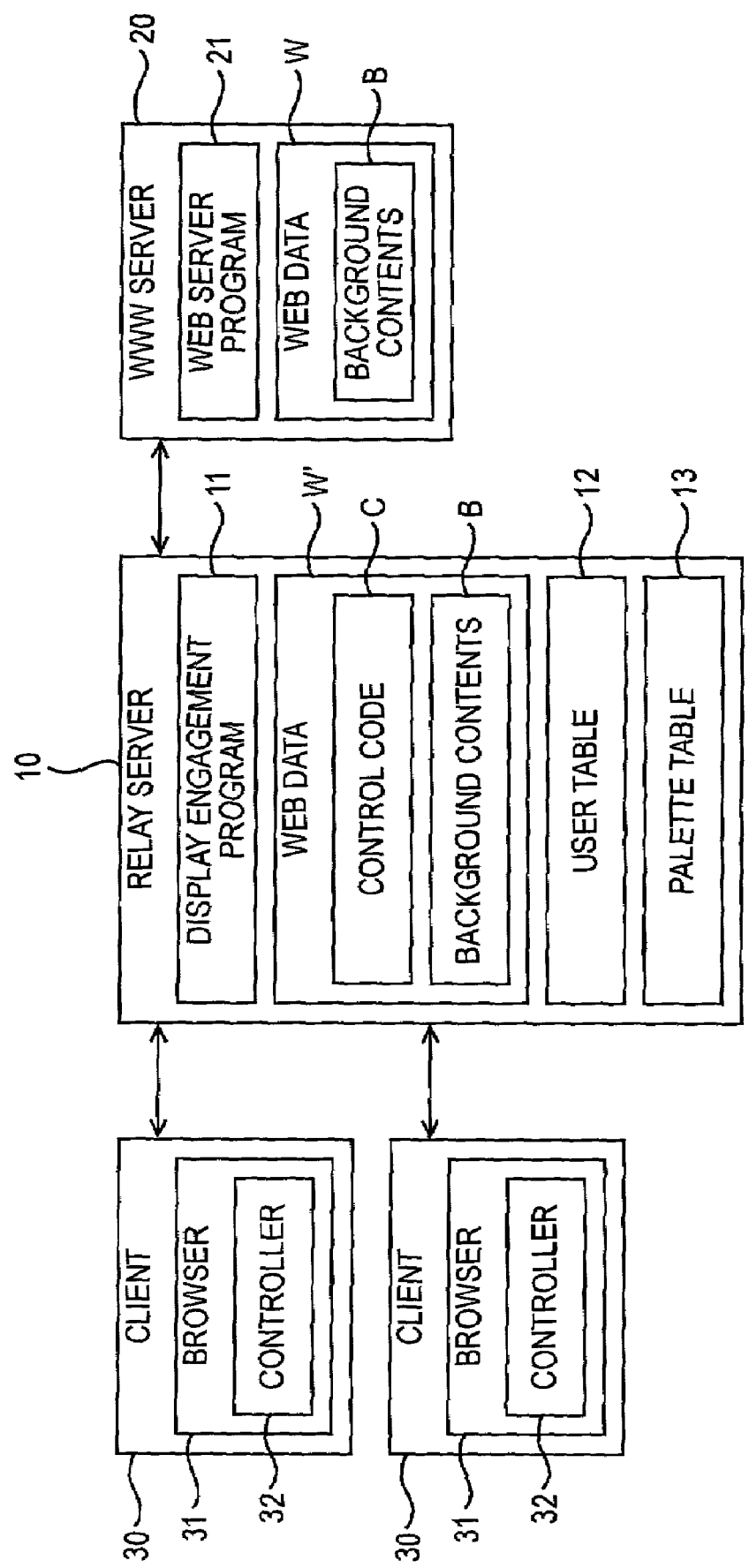
FIG. 1 is a diagram showing a system architecture in one embodiment of the present invention.

One embodiment of the present invention will hereinafter be described with reference to the accompanying drawings. FIG. 1 is a diagram showing a system architecture including a relay server machine 10 executing a display engagement program according to the embodiment. The relay server 10 is connected to a WWW server machine 20 via a network such as the Internet. Further, the relay server 10 is connectable to client machines 30 via the network.

The relay server 10, a server computer, has a storing device in which an operating system and the display engagement program 11 are preinstalled. The display engagement program 11 comprises a web server program module and a server-side program module.

The WWW server 20 has a storing device in which an operating system and a web server program are preinstalled. Further, with the storing device of the WWW server 20, web data W is stored. The web data W includes data written in HTML or XHTML, and background contents B composed of image data.

The client machine 30, a client computer, is composed of a computer such as a personal computer. The client 30 has a storing device in which an operating system and a web browser program 31 are preinstalled. The user of the client 30, as described later, logs in to the relay server 10 from the client 30. After the log-in, the browser 31 in the client 30 receives control code composed of a script or bytecode from the relay server 10, and the control code becomes a controller 32 which controls the processes in the browser 31.

Figure 2:
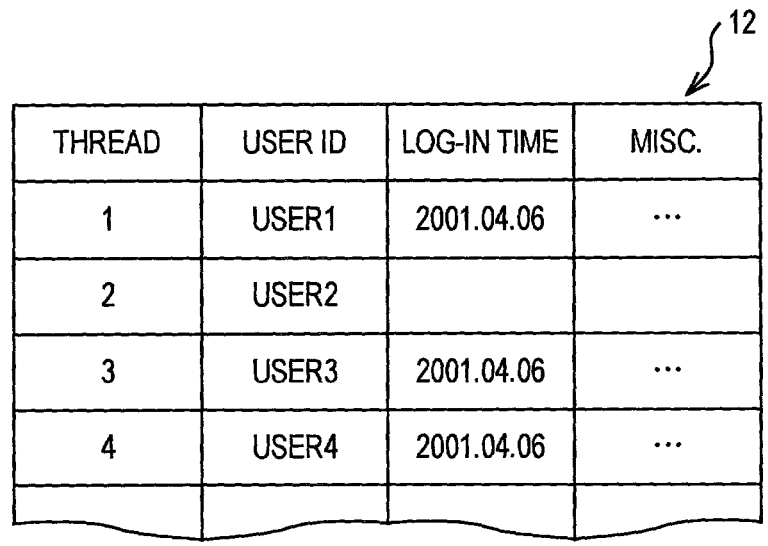
FIG. 2 is a schematic diagram showing a user table.

With the storing device of the relay server 10, a user table 12 is stored. FIG. 2 is a schematic diagram showing the user table 12, which has records corresponding to respective users registered previously. In the user table 12, each record has "USER ID," "LOG-IN TIME," and "MISC." fields.

The "USER ID" field is stored with a user ID uniquely corresponding to one of users. As the user ID, the log-in name, the host name of the client 30, or the nickname of the user, can be used. The "MISC." field is stored with the user's real name, an ID number, etc.

When one of the users logs in to the relay server 10 from the client 30, the log-in time is stored in the "LOG-IN TIME" field of the record in the user table 12 corresponding to the same user. Note that when the user logs in, the display engagement program 11 assigns a thread corresponding to the same user.

Figure 3:
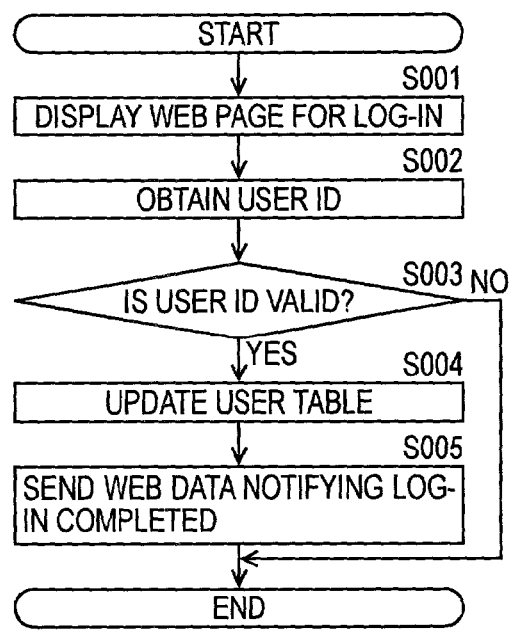
FIG. 3 is a flowchart showing a log-in process.

The log-in process will be described below. FIG. 3 is a flowchart showing the log-in process in the relay server 10. After a user launches the browser 31 by operating the client 30, the browser 31 requests web data for log-in from the display engagement program 11 in the relay server 10 to start the process shown in FIG. 3.

At S001, the relay server 10 makes the client 30 display the web data for log-in as a web page. Then, the user enters the user ID into the displayed web page.

At the next step S002, the relay server 10 obtains the user ID entered by the user from the client 30.

At the next step S003, the relay server 10 judges whether the entered user ID is valid or not. More specifically, the relay server 10 refers to the user table 12 to find the record whose "USER ID" field contains the user ID identical to that entered at S002. The relay server 10, if the record is found, advances the processing to S004. Whereas if not found, the relay server 10 terminates the processing.

At S004, the relay server 10 updates the user table 12. More specifically, the relay server 10 stores the present time in the "LOG-IN" field of the record whose user ID is identical to that obtained at S002, and assigns a thread corresponding to the user.

At S005, the relay server 10 sends the client 30 web data for notifying the fact that the log-in has successfully been completed. The sent web data contains control code for the initial processing which is composed of a script or an applet. The client 30, when receives the web data for notifying, executes the control code. Note that the control code becomes the controller 32 to control the browser 31 by being executed on the same browser 31.

After the processing shown in FIG. 3, the display engagement process is executed as described later with reference to FIG. 8. With the display engagement process, each user can paste desired objects such as image data to contents displayed in an engaged fashion among the users. Note that the storing device of the relay server 10 is stored with a palette table 13 for managing objects.

Figure 4:
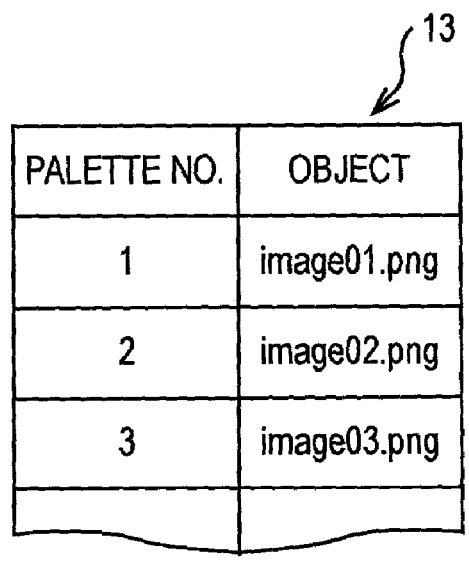
FIG. 4 is a schematic diagram showing a palette table.

FIG. 4 is a schematic diagram showing the palette table 13. The palette table 13 has records each including a unique "PALETTE NUMBER" (palette ID), and an "OBJECT" corresponding to the palette number. Note that each of the records in the palette table 13 corresponds to palette data. The objects may be a still image, moving images, or text data.

Figure 5:
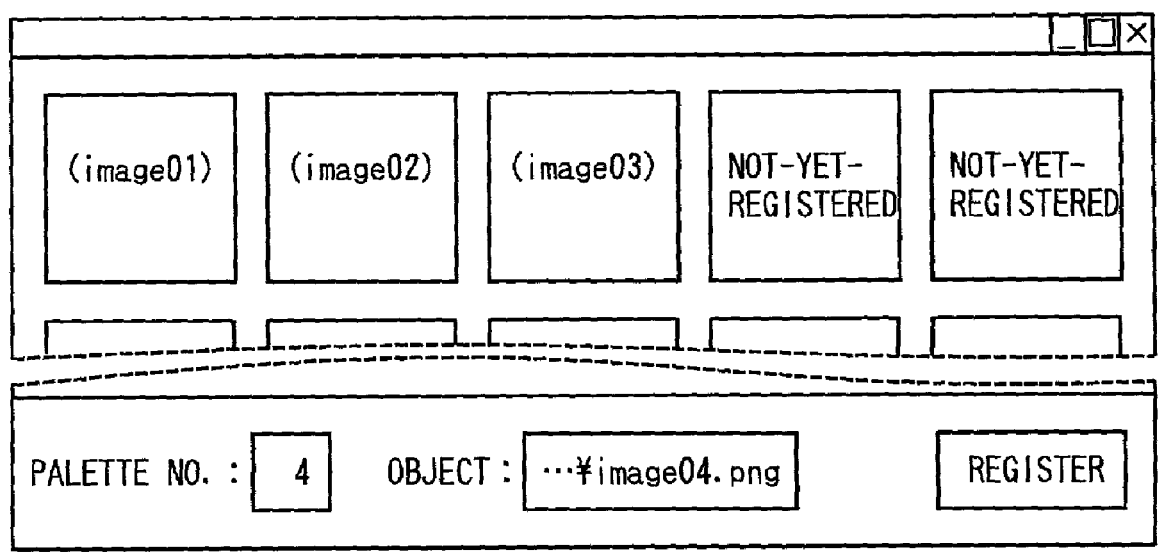
FIG. 5 is a schematic diagram showing a palette window.

The client 30 can obtain the entity of the palette table 13 from the relay server 20. Further, the client 30 can display the obtained entity of the palette table 13 as a palette window. FIG. 5 is a schematic diagram showing the palette table 13. In the palette window, the objects included in the palette table 13 are displayed in ascending order of the palette numbers. According to the example shown in FIG. 5, objects, "image01," "image02," and "image03" are schematically shown. On the other hand, in the regions to which no objects are assigned, are displayed the character string of "NOT-YET-REGISTERED"

Further, in the palette window, are displayed a text box for designating a "PALETTE NO.," another text box for designating the "FILE NAME" of an object, and the "REGISTER" button. The user of the client 30 enters a palette number not-yet-assigned to any object, and a desired file name of an object into the respective text boxes. Then, the user can register the object with the palette table 13 by pressing the "REGISTER" button. The registration process may be executed before or after the display engagement starts.

Figure 6:
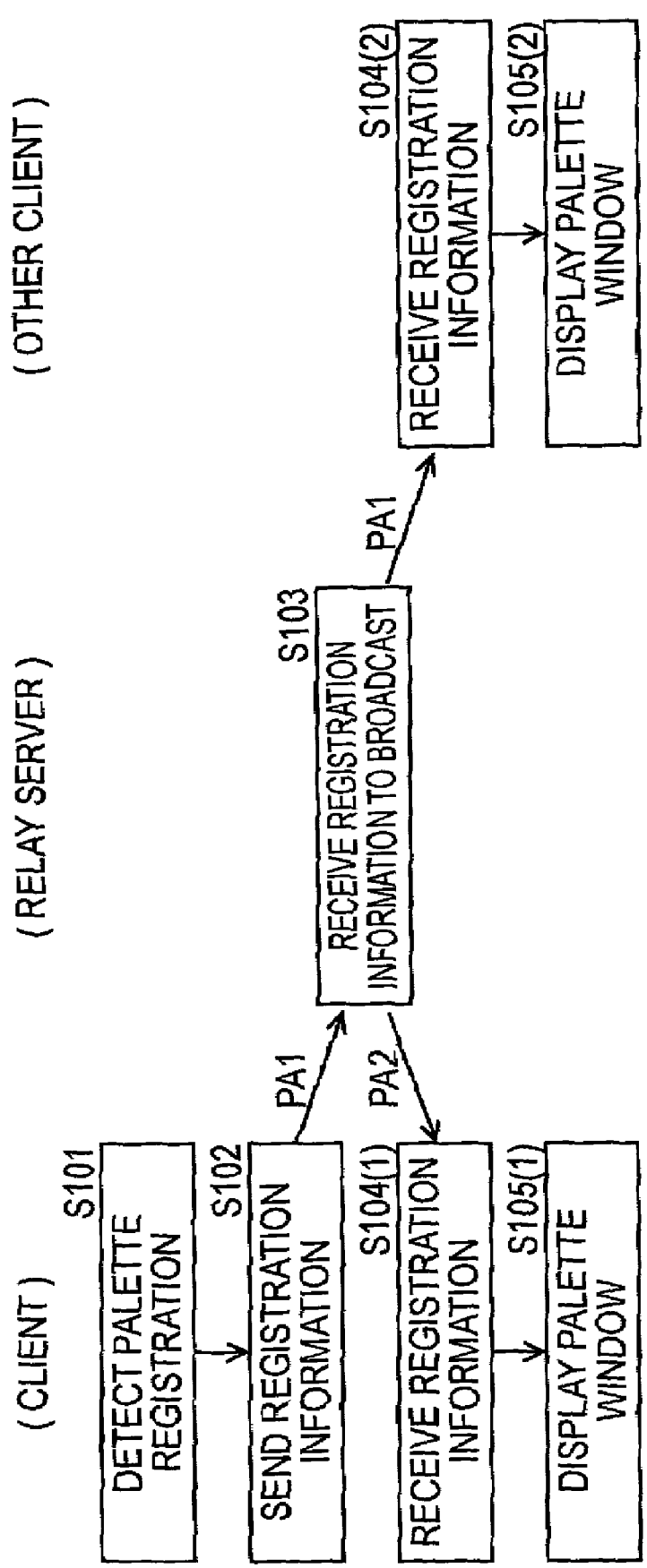
FIG. 6 is a schematic diagram showing a process for registration with a palette table.

The registration process with the palette table 13 will hereinafter be described with reference to the FIG. 6. When the user of a client 30 executes registration of the palette via the palette window shown in FIG. 5, the controller 32 of the client 30 detects the event concerning the registration (S101). Then, the controller 32 obtains the palette number and the file name of the object entered into the text boxes in the palette window shown in FIG. 5.

Further, the controller 32 generates registration information based on the event detected at S101, and sends the information to the relay server 10 according to a protocol PA1 (S102). FIG. 7 is a schematic diagram showing the protocol PA prescribed for the palette registration. The protocol PA is classified into a protocol PA1 and a protocol PA2. What is used for sending registration information at S102, is the protocol PA1.

As shown in FIG. 7, the protocol PA1 has a field indicating that the information to be sent is related to "Palette Registration," and also has "Sender's User ID, " "Receivers' User ID's," "Palette No.," "Image of Object" fields. The "Sender's User ID" field is stored with the user ID of the user whose client 30 detected the event. The "Receivers' User ID's" field is stored with all user ID's except the sender's. The "Palette Number" field is stored with the palette number obtained at S101.

It should be noted that the "Image of Object" field is stored with image data indicated by the file name of the object obtained at S101. More specifically, when the file indicated based on the file name of the object is stored in the storing device of the client 30, the controller 32 reads the file from the storing device. When the file exists on the network, the controller 32 reads the file via the network. Further, the controller 32 stores the file in the "Image of Object" field.

When the registration information is sent according to the protocol PA1, the relay server 10 receives the registration information, generates palette data based on the palette number and the image data of the object, registers the palette data with the palette table 13, and broadcasts the registered information to each client 30 (S103). While the registered information is sent to all of the clients 30 except the sender according to the aforementioned protocol PA1, the information is sent to the sender's client 30 according to the protocol PA2 which has no image data of the object. As shown in FIG. 7, the protocol PA2 has the "Palette Registration," "Sender's User ID," and "Receivers' User ID's" fields identical to the aforementioned protocol PA1. In addition to that, the protocol PA2 only has "Registration Completed" field stored with a code indicating that the registration with the palette table 13 has been completed.

Then, the controller 32 of the sender's client 30 receives the registration information sent according to the protocol PA2 (S104(1)), and displays the palette window including the registered objects (S105(1)). On the other hand, the clients 30 except the sender's receives the registration information sent according to the protocol PA1 (S104(2)), extracts the palette number and the image data of the object from the registration information, adds the corresponding object to update the palette window, and displays the updated window (S105(2)). All clients 30 therefore share the entity of the palette table 13. As described above, the user of each client 30 can register desired data such as local data or data on the network to the palette table 13. After the registration, the registered object becomes available to all of the users.

The display engagement process will hereinafter be described with reference to FIG. 8. When the client 30 that has already logged in according to the process shown in FIG. 3 requests the web data W containing the background contents B (S201), the relay server 10 requests the web data W from the WWW server 20 (S202). In reply to the request, the WWW server 20 sends the web data W to the relay server 10 (S203). FIG. 9 is an explanatory diagram showing an example of the original web data W. The relay server 10 receives the web data W, and stores the web data W in cashe, a certain area reserved in the storing device (S204).

Further, the relay server 10 embeds the control code C for display engagement in the stored original web data W to generate web data W' for display in an engaged fashion (S205). The control code C, for instance, comprises code written in HTML or XHTML, a script written in JavaScript, or bitecode of Java Applet. The control code C may be composed of parameters to be passed to the browser.

Then, the relay server 10 sends a cashe URL, a URL indicating the generated web data W', to the client 30 (S206). The client 30 receives the cashe URL, and requires the web data W' by designating the received cashe URL under control of the controller 32 (S207). In reply to the request, the relay server 10 sends the web data W' to the client 30 (S208).

Figure 10:
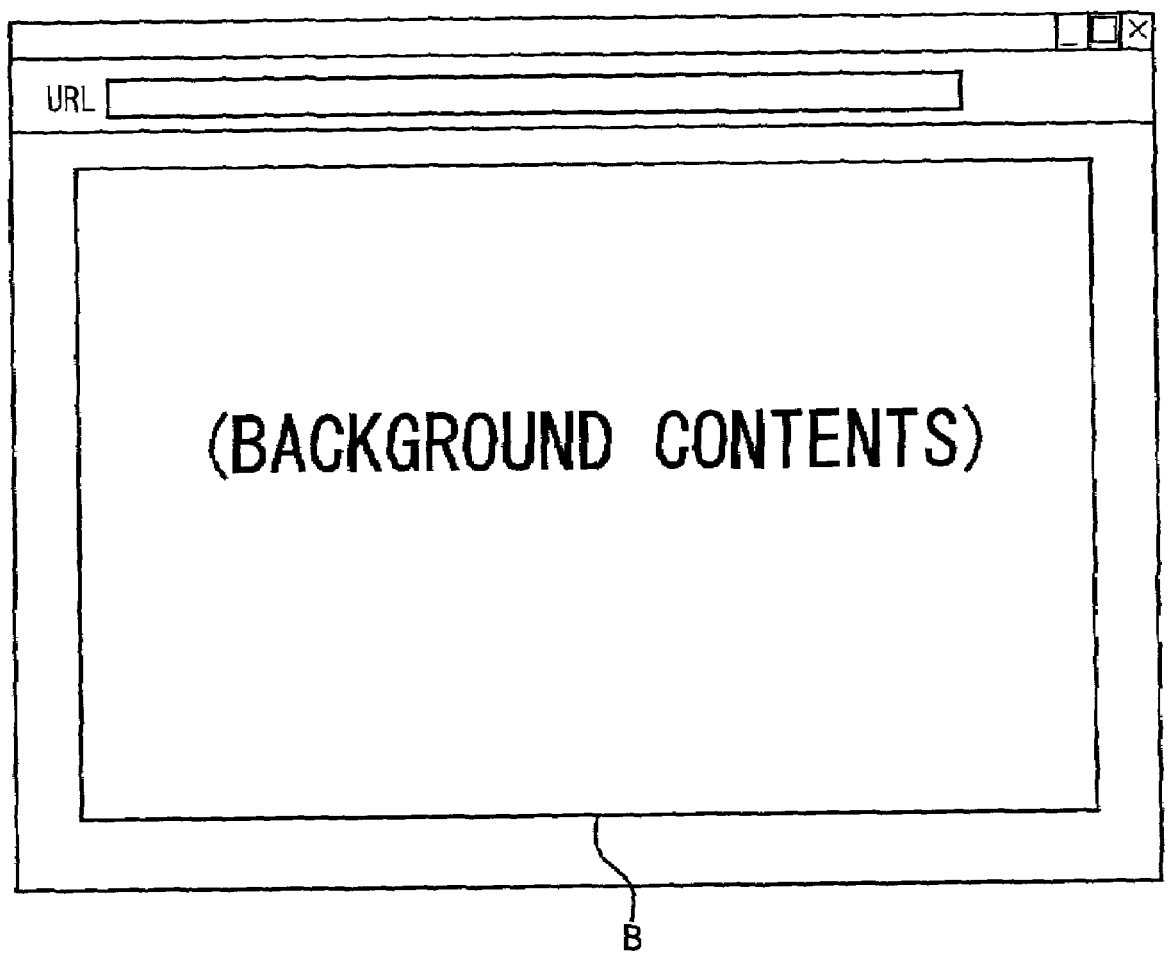
FIG. 10 is a diagram showing an example of a screen displayed based on web data.

The client 30 receives the web data W', and displays a web page generated based on the same web data W' (S209). FIG. 10 is a schematic diagram showing an example of a screen displayed based on the web data W'. In FIG. 10 is schematically shown the background contents B including image data. Note that in the web data not only the background contents B is included, but also the aforementioned control code C is embedded. Consequently, a function for display engagement is added to the controller 32, by the control code C being executed in the browser 31 of the client 30. However, if the control code C composed of parameters to be passed to the browser 31, the function for display engagement is added to the controller 32 by the parameters being passed to the browser 31. Note that in the screen based on the web data W', an operational component for user's manipulation may be displayed.

As described above, each client 30 displays the common background contents B in an engaged fashion. With the display engagement being established, the user of each client 30 can paste the desired one selected from the objects registered with the palette table 13 to the background component B. Note that each of the users, if required, can newly register any object by executing the aforementioned palette registration process shown in FIG. 6, and use the registered object.

The process executed when an object is pasted will hereinafter be described with reference to FIG. 11. When the user of a client 30 copies a desired object in the palette window shown in FIG. 5 and pastes it to the background contents B, the controller 32 of the client 30 detects the event representing the pasting of the object (S301), generates manipulating information indicating the detected event to send it to the relay server 10 according to the protocol PB (S302(1)), and also reflects the detected event in the client 30 itself (S302(2)).

The manipulating information sent at S301(1) will further be described. FIG. 12 is a schematic diagram showing a protocol PB prescribed for the manipulating information. The protocol PB has the field indicating that the information to be sent is related to "Manipulation of Object," and also has "Sender's User ID," and "Receivers' User ID's" fields. The "Sender's User ID" field is stored with the user ID of the user whose client 30 detected the event. The "Receivers' User ID's" field is stored with the all other users' user ID's.

Further, the protocol PB has "Palette No.," "Width and Height," "Position X, Y," "Z-Index," and "Frame No." fields. The "Palette No." field is stored with the palette number of the object which the user copied from the palette window. The "Width and Height" field is stored with the values indicating the width and height of the object. The "Position X, Y" field is stored with the values indicating the horizontal and vertical positions where the object should be pasted.

The object is treated as a layer object prescribed in HTML and XHTML. The "Z-Index," field is stored with the value indicating the Z-index representing the layer where the object should be pasted. Note that Z-indices are uniquely assigned to objects. A certain initial value of Z-index, for instance "1," is assigned to the first object pasted to the background contents B where none of other contents are pasted. After that, the incremented Z-index is assigned to the object newly pasted.

When the background contents comprise plural frames, the frame number of the frame where the object is pasted, is stored in the "Frame No." field.

When the manipulating information is sent according to the protocol PB, the relay server 10 receives the manipulating information, stores it, and broadcast it to all the clients 30 except the sender according to the protocol PB (S303). That is, the relay server 10 broadcasts the layout information to the clients 30 of the users whom "Receivers' User ID's" of the manipulating information indicate. Note that the manipulating information is not sent to the sender's client 30.

Figure 13:
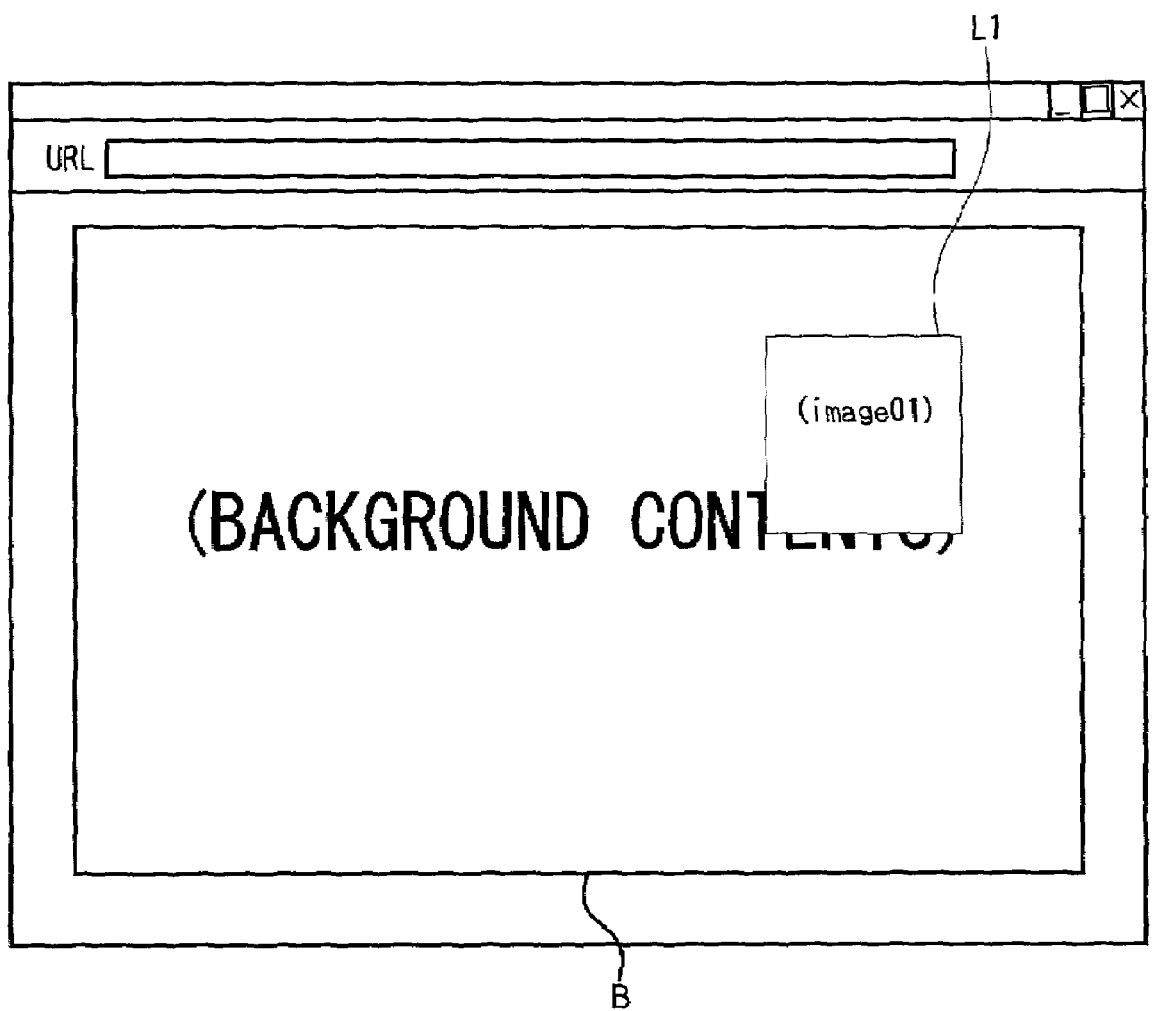
FIG. 13 is an example of a screen in which an object is pasted.

The controllers 32 of clients 30 except for the sender receive the broadcasted manipulating information (S304), and reflect the manipulation indicated by the manipulating information (S305). More specifically, each controller 32 refers to "Palette No.," "Width and Height," "Position X, Y," "Z-Index," and "Frame No." Then, the controller 32 displays the object corresponding to the "Palette No." with the size indicated by "Width and Height" at "Position X, Y" on the layer indicated by "Z-Index" in the frame indicated by "Frame No." According to that, the object is pasted to the background contents B with a desired status. FIG. 13 is an example of a screen where the object L1 of "image01" is pasted to the background contents B.

As described above, the screens of the clients 30 except for the sender's are updated based on the manipulating information. Note that the screen of the sender's client 30 has already updated based on the manipulation detected in the same client 30 (S302(2)). Consequently, the update is reflected in every client 30. That is, the common screen where an object is pasted to the background contents B as shown in FIG. 13, is displayed on the screen of every client in an engaged fashion.

Figures 14, 15:
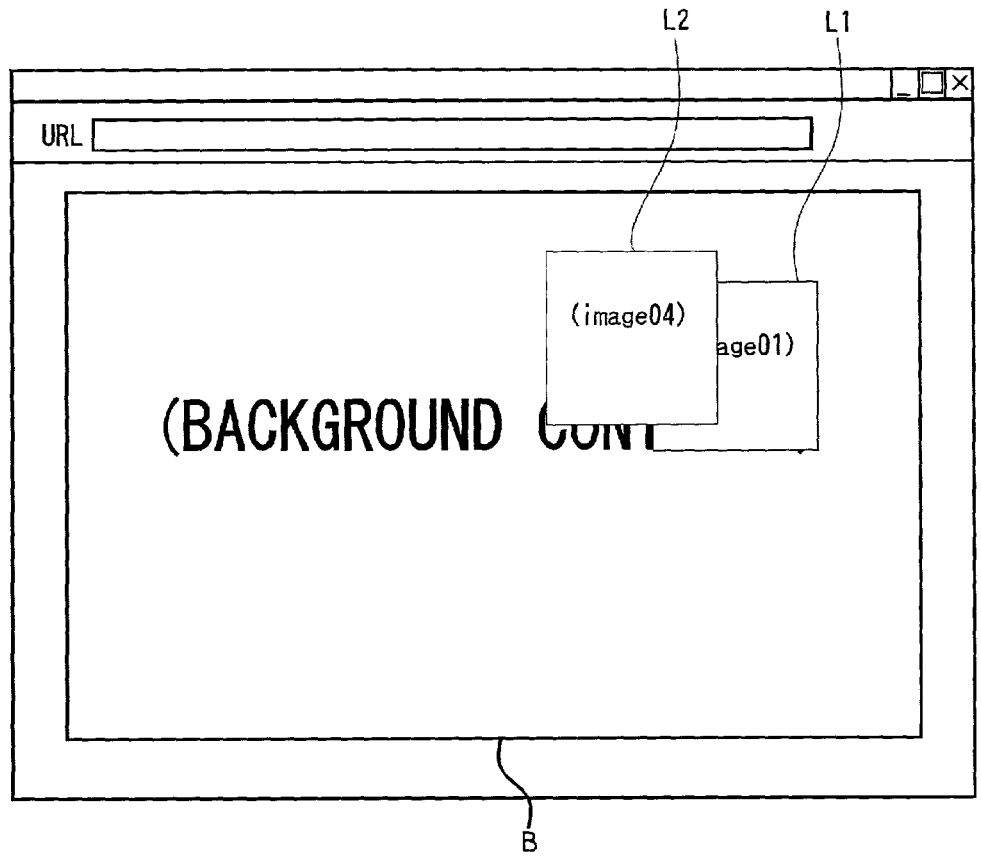
FIG. 14 is an example of a screen in which an object is pasted over another.
FIG. 15 is a schematic diagram showing management of objects.

Likewise, the users of the other clients 30 can paste desired objects. FIG. 14 shows an example of the screen where a certain user pasted the object L1 of "image01," then, another user pasted the object L2 of "image04." The Z-index of the object L2 pasted later is greater than that of the object L1 pasted previously. Consequently, the object L2 pasted later is displayed with being pasted over the object L1 pasted previously.

In the status shown in FIG. 14, the controller 32 of the client 30 whose user pasted the object L2 of "image04," manages the objects L1, L2 with making a distinction between the object L1 pasted by the other user and the object L2 pasted by the user of the same client 30.

FIG. 15 is a schematic diagram showing the management of the objects. According to FIG. 15, the controller 32 of the client whose user pasted the object L2, only displays the object L1 pasted by the other user. The controller 32, however, continuously monitors generation of the events, raised by manipulation of the user, related to the object L2 pasted by the same user. That is, the user can execute desired manipulation selected from move, modify, and delete only on the object L2 pasted by the user.

Figure 11:
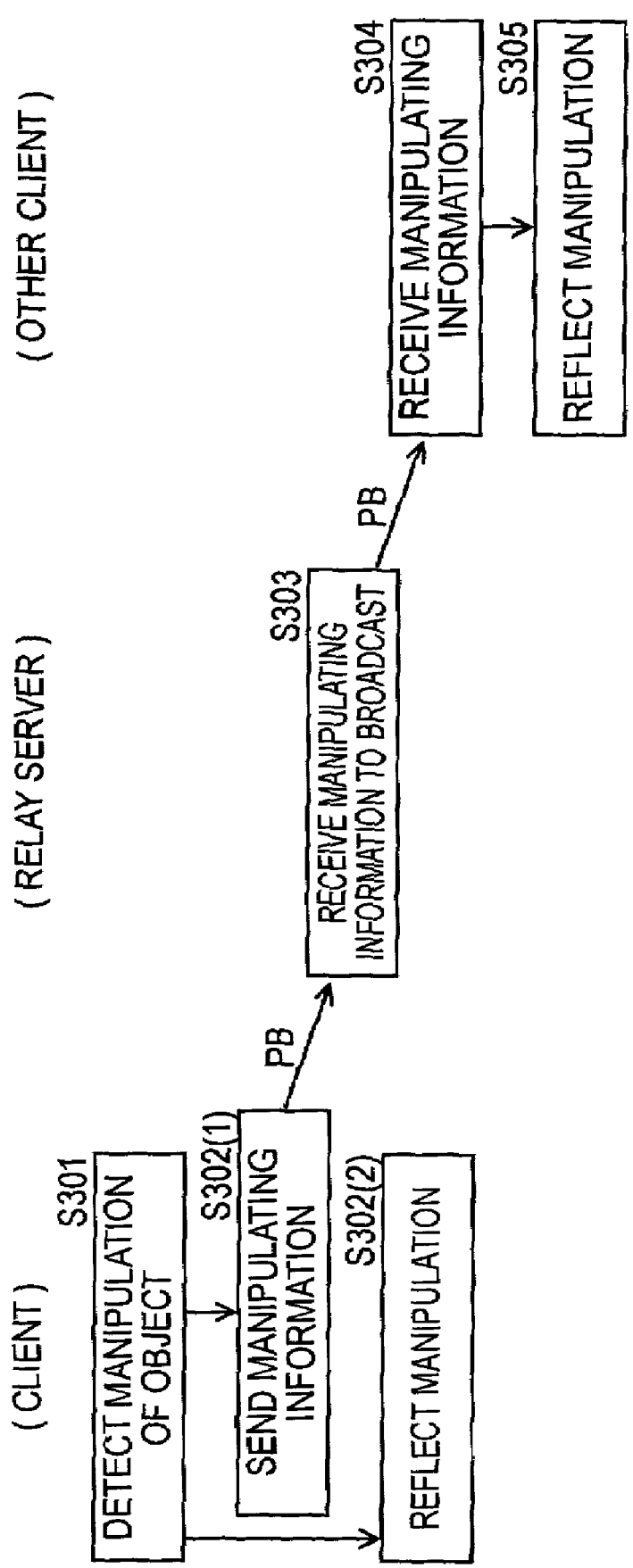
FIG. 11 is a schematic diagram showing a process for a manipulation of an object.

The manipulation such as move, modify or delete, is executed according to the aforementioned process shown in FIG. 11. For instance, when the user who pasted the object L2 of "image04" shown in FIG. 14 modifies the object L2 by operating a pull-down menu with the mouse, the aforementioned process is executed according to FIG. 11. Note that the "Z-Index" of the manipulating information generated and sent at S302(1), should be identical to the originally assigned value instead of an incremented value. The value reflecting the modification is set to the "Width and Height" of the manipulating information. If the manipulation changed the position, the value reflecting the manipulation is set to the "Position X, Y."

Figure 16:
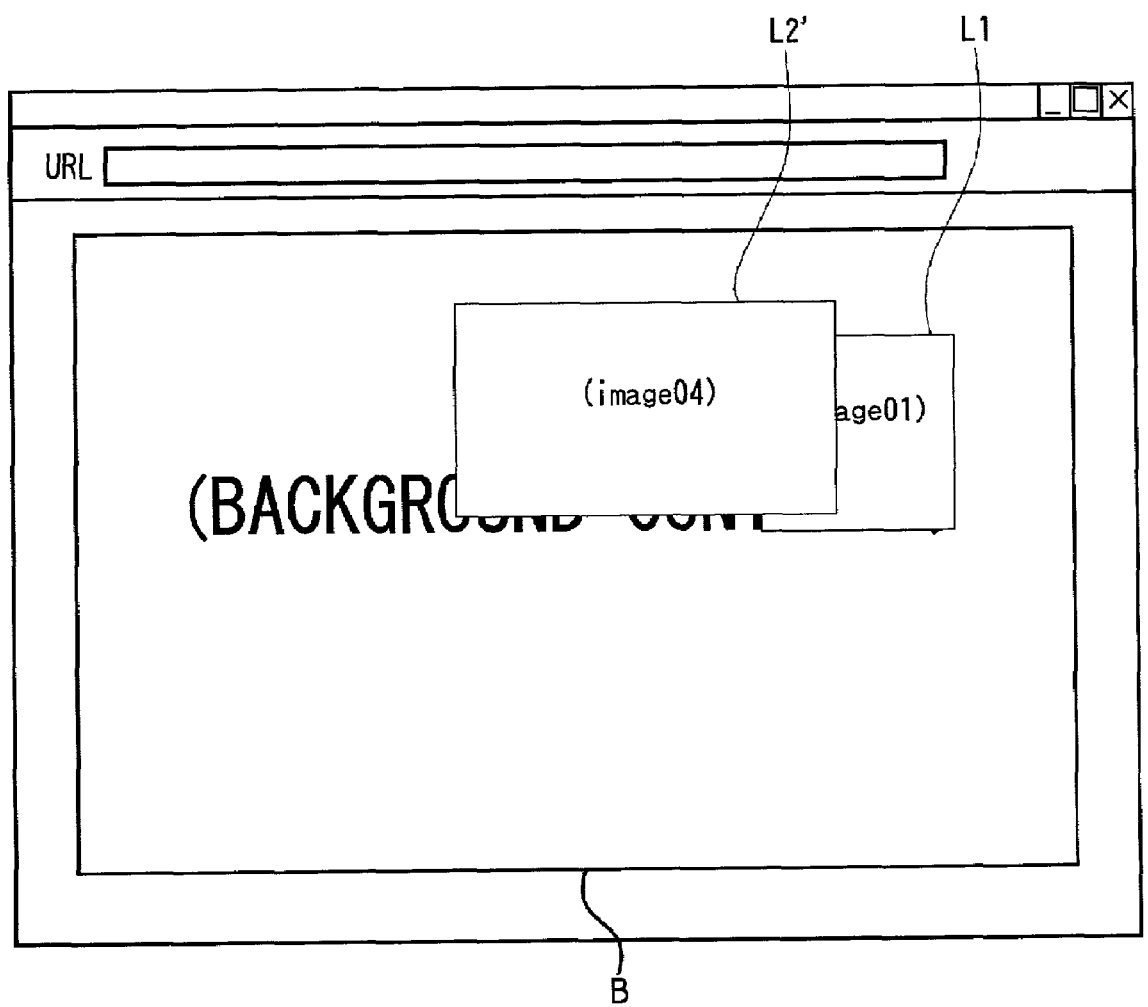
FIG. 16 is an example of a screen in which an object is modified.

After the manipulation and the manipulating information indicating the same manipulation are reflected (302(2), S305), the screen of every client 30 is updated as shown in FIG. 16. That is, the modified object L2' shown in FIG. 16 is displayed on the layer where the object L2 was displayed, instead of the same object L2. The modification is reflected in every client 30.

The manipulation of deletion is executed by the "Palette No." of the manipulating information generated and sent at S302(1) being set to NULL. As the manipulation and the manipulating information indicating the same manipulation are reflected (302(2), S305), the object displayed on the screen of every client 30 comes to be deleted.

According to the description above, the users can move, modify, and delete only the objects pasted by themselves. Without restriction to the example, the display engagement program 11 may be set like that the user who does not paste the object can move, modify, delete the same object.

After the users have pasted the desired objects, the relay server 10 can store the entity on the screen of the client 30. That is, the relay server 10 can execute a snapshot process for storing the entity on the screen as snap data.

Figure 17:
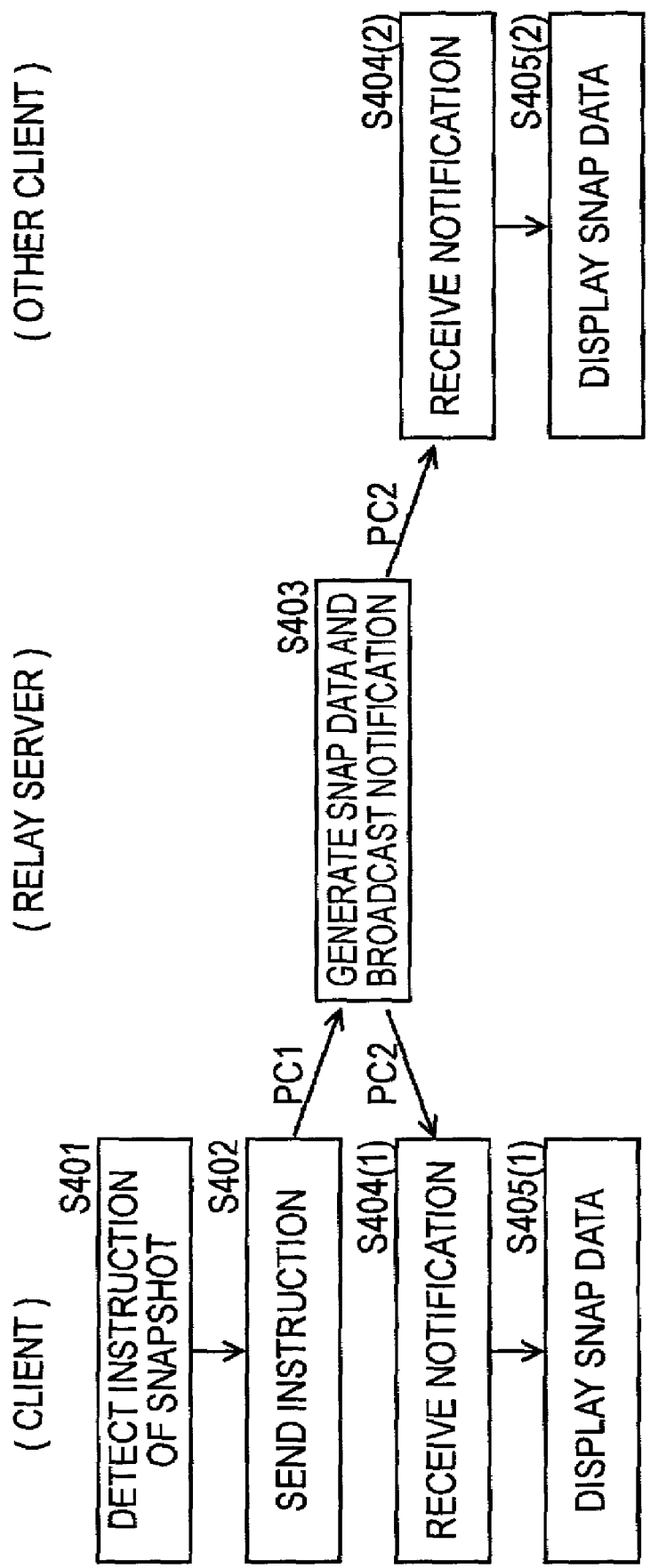
FIG. 17 is a schematic diagram showing a snapshot process.

FIG. 17 is a schematic diagram showing the snapshot process. The snapshot process starts when one of the users gives an instruction for the snapshot to the client 30. When the instruction is made, the controller 32 of the client 30 detects the instruction (S401), and generates instruction information to send it to the relay server 10 according to the protocol PC1 (S402).

FIG. 18 is a schematic diagram showing the protocol PC prescribed for the snapshot process. The protocol PC is classified into the protocol PC1 and the protocol PC2. What is used for sending the instruction information at S402, is the protocol PC1.

The protocol PC1 has the field indicating that the information to be sent is related to "Snapshot," and also has "Sender's User ID," and "Receivers' User ID's" fields. The "Sender's User ID" field is stored with the user ID of the user whose client 30 detected the instruction for the snapshot. The "Receivers' User ID's" field is stored with all other users' user ID's. In addition to that, the protocol PC1 has a code of "Instruction Made" indicating that an instruction for the snapshot process has been made.

When the instruction information is sent according to the protocol PC1, the relay server 10 receives the instruction information, generates the snap data including the entity on the screen at the time, and broadcasts the notification indicating that the generation is completed according to the protocol PC2 (S403).

Figures 8, 9:
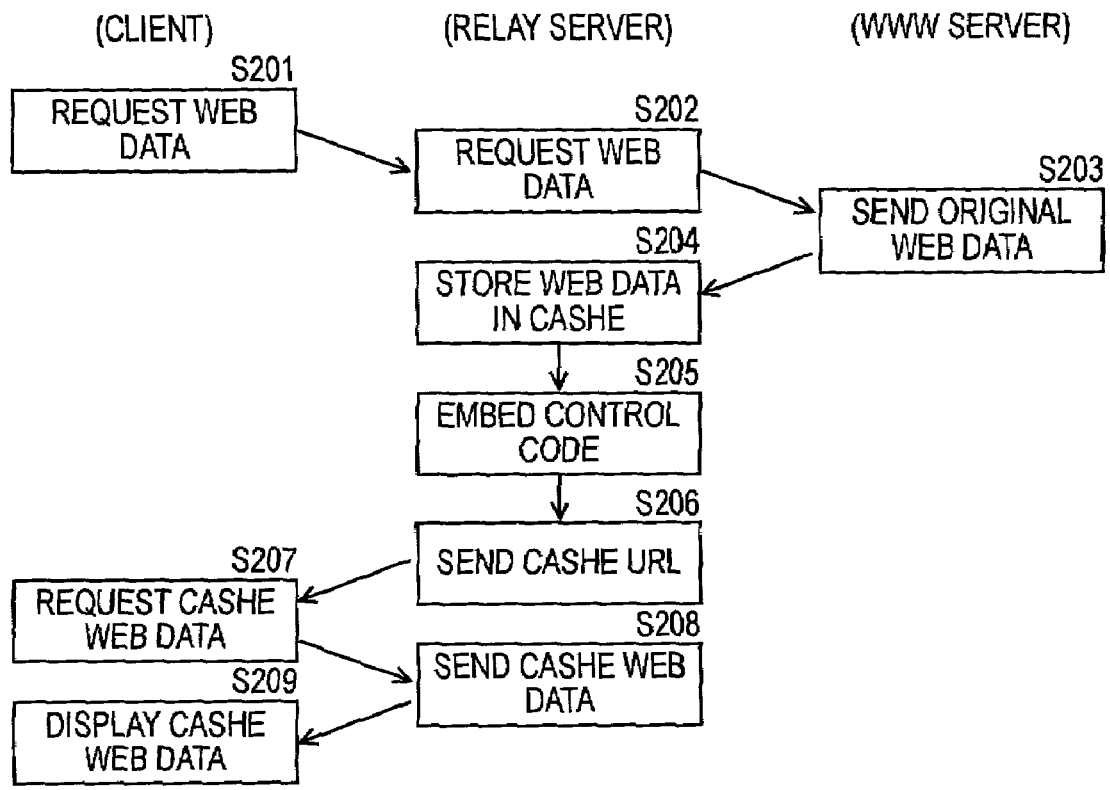
FIG. 8 is a schematic diagram showing a process for a display engagement process.
FIG. 9 is an explanatory diagram showing an example of web data.

It should be noted that the relay server 10 generates the snap data based on the web data W shown in FIG. 9 received at S204 in FIG. 8, and information extracted from the manipulating information received at S303 in FIG. 11. FIG. 19 is an explanatory diagram showing an example of the snap data. As shown in FIG. 19, the snap data is generated based on the background contents B shown in FIG. 9 and the data of the objects L1, L2' displayed at the time of the generation of the snap data. On the one hand, the portion, "style='. . . (1) . . . '" in FIG. 19, designates the size and the position of the object L1. On the other hand, the portion, "style='. . . (2) . . . '" in FIG. 19, designates the size and the position of the object L2. Note that the image data of the background contents B, "basedata.png" shown in FIG. 19, may be stored in the storing device of the relay server 10 as a portion of the snap data.

As shown in FIG. 18, the protocol PC2 used for broadcasting the notification has "Snapshot," "Sender's User ID," and "Receivers' User ID's" fields identical to the aforementioned protocol PC1. In addition to that, the protocol PC2 has "Completed," and "URL" fields. The "Completed" field is stored with a code indicating that the generation of the snap data has been completed. The "URL" field is stored with a URL indicating the snap data.

Then, the controller 32 of each client 30 receives the notification (S404(1), S404(2) in FIG. 17). After that, the controller 32 of each client 30 can designate the "URL" included in the received notification to receive the snap data from the relay server 10, and display the snap data as a web page (S405(1), S405(2)).

Consequently, after the display engagement is interrupted, the controller 32 of the client 30 can restore the screen displayed just moments before the interruption by receiving the snap data from the relay server 10. Because the snap data includes the Z-indices indicating the respective layers of the objects, the relationship among the objects is identical to that established just moments before the interruption. Further, the snap data may include information relating each object to the user ID of the user who pasted the same object. Provided that, only the user who pasted the object can manipulate the same object even after the restoration based on the snap data, as in the state before the interruption.

As described above, work hand-in-hand among plural clients using the common image data, comes to be actualized. It is, for example, applicable to a command system displaying map data of a remote island as a background contents to which photograph data shot at a disaster scene is pasted as a layer object via mobile computer, and receiving instructions from the headquarters. It is also applicable to a remote support system displaying a map data of a pipe arrangement as a background contents to which a photograph data shot with a digital camera is pasted as a layer object via mobile computer, and receiving the instructions on repair from the headquarters.

According to the present invention with the configuration described above, desired objects can be pasted based on manipulation of users to the common contents displayed on screens of plural clients in an engaged fashion. Because the screen where the objects are pasted is also shared, users can establish communication concerning more intelligent and complicated matters based on the shared display.

While there has been described what are at present considered to be preferred embodiments of the present invention, it will be understood that various modifications may be made thereto, and it is intended that the appended claims cover all such modifications as fall within the true spirit and scope of the invention.

What is claimed is:

1. A computer-readable medium encoded with processing instructions for causing a server computer, connectable to client computers, each client computer executing a web browser, to execute:

sending said client computers web data including background contents, control code making the client computer display a layer object with reflecting manipulation on the same layer object, and control code making the client computer transmit manipulation on the layer object to said server computer;

broadcasting, when the manipulation on the layer object is transmitted from one of said client computers, the same manipulation to the other client computers;

said control code included in said web data making a client computer generate, when a manipulation of pasting an image as the layer object to the background contents is made at the same client computer, a manipulating information indicating the manipulation, sending the manipulating information to said server computer to make said server computer broadcast the manipulating information to all of the client computers except the client computer that sent the manipulating information, to make each of said client computers to which the manipulating information is broadcasted paste the layer object to the background contents according to the manipulation information;

said manipulating information including a palette ID uniquely corresponding to an object selected by a user of the client computer from a group of still images, moving images, and text data;

said control code included in said web data making said client computer specify, when the same client computer receives the manipulating information from said server computer, the object corresponding to the palette ID included in the manipulating information by referring palette data containing pairs of the palette ID and the corresponding object to process the specified object as a layer object; and said control code included in said web data making said client computer generate, when an instruction to store what is displayed is made at the same client computer, an instructing information representing the instruction, and sending the instructing information to said server computer, to make said server computer generate snap data including the layer object's status based on the manipulating information obtained from said client computers and store the generated snap data.

2. A computer-readable medium according to claim 1, further comprising:

said manipulating information including a user ID indicating the user who has made said manipulating information; and said snap data including information relating the object to a user ID indicating the user who has pasted the same object.

3. A display engagement method actualized by a server computer connectable to client computers, each client computer executing a web browser, comprising:

sending said client computers web data including background contents, control code making the client computer display a layer object with reflecting manipulation on the same layer object, and control code making the client computer transmit manipulation on the layer object to said server computer;

broadcasting, when the manipulation on the layer object is transmitted from one of said client computers, the same manipulation to the other client computers;

said control code included in said web data making a client computer generate, when a manipulation of pasting an image as the layer object to the background contents is made at the same client computer, a manipulating information indicating the manipulation, sending the manipulating information to said server computer to make said server computer broadcast the manipulating information to all of the client computers except the client computer that sent the manipulating information, to make each of said client computers to which the manipulating information is broadcasted paste the layer object to the background contents according to the manipulation information;

said manipulating information including a palette ID uniquely corresponding to an object selected by a user of the client computer from a group of still images, moving images, and text data;

said control code included in said web data making said client computer specify, when the same client computer receives the manipulating information from said server computer, the object corresponding to the palette ID included in the manipulating information by referring palette data containing pairs of the palette ID and the corresponding object to process the specified object as a layer object; and said control code included in said web data making said client computer generate, when an instruction to store what is displayed is made at the same client computer, an instructing information representing the instruction, and sending the instructing information to said server computer, to make said server computer generate snap data including the layer object's status based on the manipulating information obtained from said client computers and store the generated snap data.

4. A method according to claim 3, further comprising:

said control code included in said web data making said client computer generate, when a registration of the palette data is made at the same client computer, a registration information including the palette data, and sending the registration information to said server computer to make said server computer broadcast the registration information to all of the client computers except the client computer that sent the registration information, to make each of said client computers to which the registration information is broadcasted store the palette data included in the registration information.

5. A method according to claim 3, further comprising:

said manipulating information including a user ID indicating the user who has made the same manipulating information; and said snap data including information relating the object to a user ID indicating the user who has pasted the same object.

6. A display engagement system, comprising:
a server computer connectable to client computers, each client computer executing a web browser; and
a computer-readable medium encoded with processing instructions for causing said server computer to execute:
  sending said client computers web data including background contents, control code making the client computer display a layer object with reflecting manipulation on the same layer object, and control code making the client computer transmit manipulation on the layer object to said server computer,
  broadcasting, when the manipulation on the layer object is transmitted from one of said client computers, the same manipulation to the other client computers, and
  said control code included in said web data making a client computer generate, when a manipulation of pasting an image as the layer object to the background contents is made at the same computer, a manipulating information indicating the manipulation, sending the manipulating information to said server computer to make said server computer broadcast the manipulating information to all of the client computers except the client computer that sent the manipulating information, to make each of said client computers to which the manipulating information is broadcasted past the layer object to the background contents according to the manipulation information,
wherein
  said manipulating information includes a palette ID uniquely corresponding to an object selected by a user of the client computer from a group of still images, moving images, and text data,
  said control code included in said web data makes said client computer specify, when the same client computer receives the manipulating information from said server computer, the object corresponding to the palette ID included in the manipulating information by referring palette data containing pairs of the palette ID and the corresponding object to process the specified object as a layer object, and
  said control code included in said web data makes said client computer generate, when an instruction to store what is displayed is made at the same client computer, an instructing information representing the instruction, and sends the instruction information to said server computer to make said server computer generate snap data including the layer object's status based on the manipulating information obtained from said client computers and store the generated snap data.

7. A system according to claim 6, wherein
said control code included in said web data makes said client computer generate, when a registration of the palette data is made at the same client computer, a registration information including the palette data, and send the registration information to said server computer to make said server computer broadcast the registration information to all of the client computers except the client computer that sent the registration information, to make each of said client computers to which the registration information is broadcasted store the palette data included in the registration information.

8. A system according to claim 6, wherein
said manipulating information includes a user ID indicating the user who has made the same manipulating information, and
said snap data includes information relating the object to a user ID indicating the user who has pasted the same object.

* * * * *